(12) United States Patent
Soda et al.

(10) Patent No.: US 8,537,379 B2
(45) Date of Patent: Sep. 17, 2013

(54) DOCUMENT READING APPARATUS HAVING A FUNCTION FOR READING A DOCUMENT ON A DISPLAY SCREEN AND IMAGE FORMING APPARATUS INCLUDING THE DOCUMENT READING APPARATUS

(75) Inventors: Kazunori Soda, Nara (JP); Kazumasa Tonami, Yamato-Koriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1239 days.

(21) Appl. No.: 12/360,159

(22) Filed: Jan. 27, 2009

(65) Prior Publication Data
US 2009/0201517 A1 Aug. 13, 2009

(30) Foreign Application Priority Data
Feb. 12, 2008 (JP) ................................. 2008-030036

(51) Int. Cl.
G06F 3/12 (2006.01)

(52) U.S. Cl.
USPC ........................................................ 358/1.13

(58) Field of Classification Search
None
See application file for complete search history.

(56) References Cited

U.S. PATENT DOCUMENTS

| 4,151,562 A * | 4/1979 | Tregay ................. 358/426.02 |
| 5,742,279 A | 4/1998 | Yamamoto et al. |
| 7,205,988 B2 | 4/2007 | Nakamura et al. |
| 2007/0064288 A1 * | 3/2007 | Lee ................................. 358/527 |

FOREIGN PATENT DOCUMENTS

| JP | 02-195769 | 8/1990 |
| JP | 06-309450 | 11/1994 |
| JP | 07-129749 | 5/1995 |
| JP | 2004-153327 | 5/2004 |
| JP | 2006-179977 | 7/2006 |
| JP | 2006-184973 | 7/2006 |
| JP | 2008-123476 | 5/2008 |

* cited by examiner

*Primary Examiner* — Jeremiah Bryar
(74) *Attorney, Agent, or Firm* — Renner, Otto, Boisselle & Sklar, LLP

(57) ABSTRACT

A document reading apparatus includes an integral display portion integrally provided with the area sensor portion and a main CPU for controlling screen display of the integral display portion, in which reflection light from an object placed on a screen of the integral display portion is detected by the area sensor portion. Based on an area of reflection light from the object detected by the area sensor portion, the main CPU determines whether or not the object is a document, and when determined that it is a document, it sets a document reading mode for reading the document placed on the screen by the area sensor portion.

13 Claims, 17 Drawing Sheets

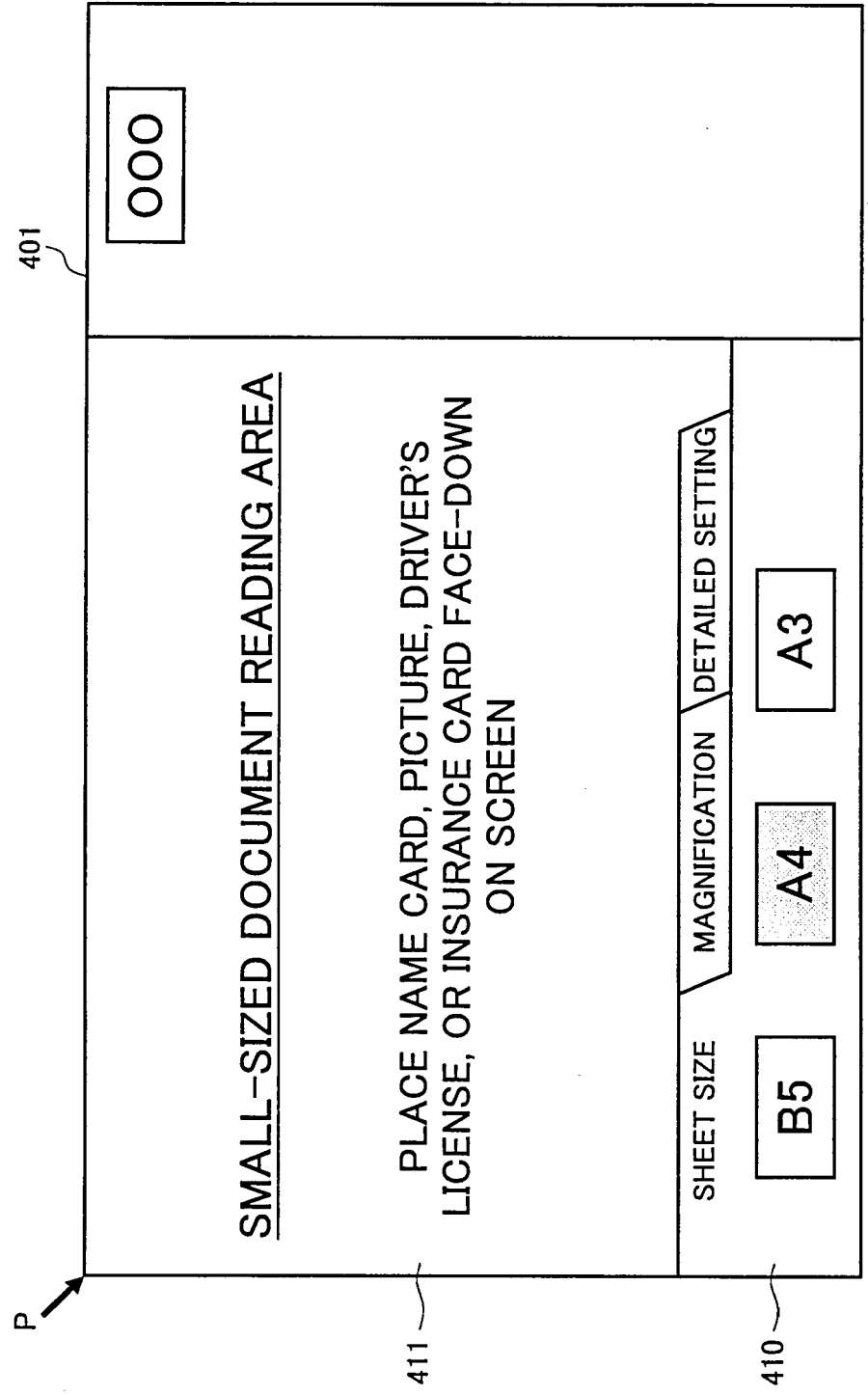

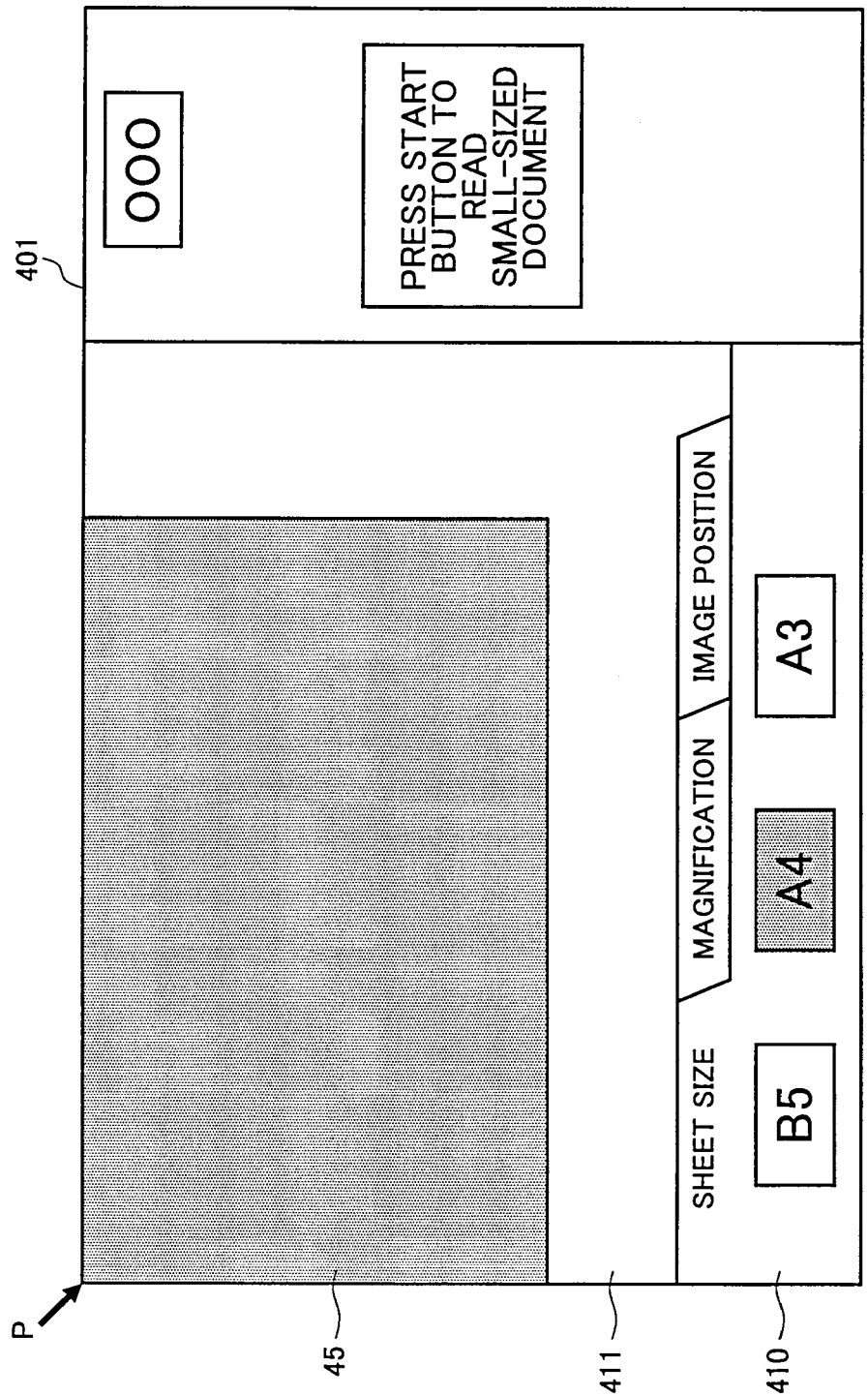

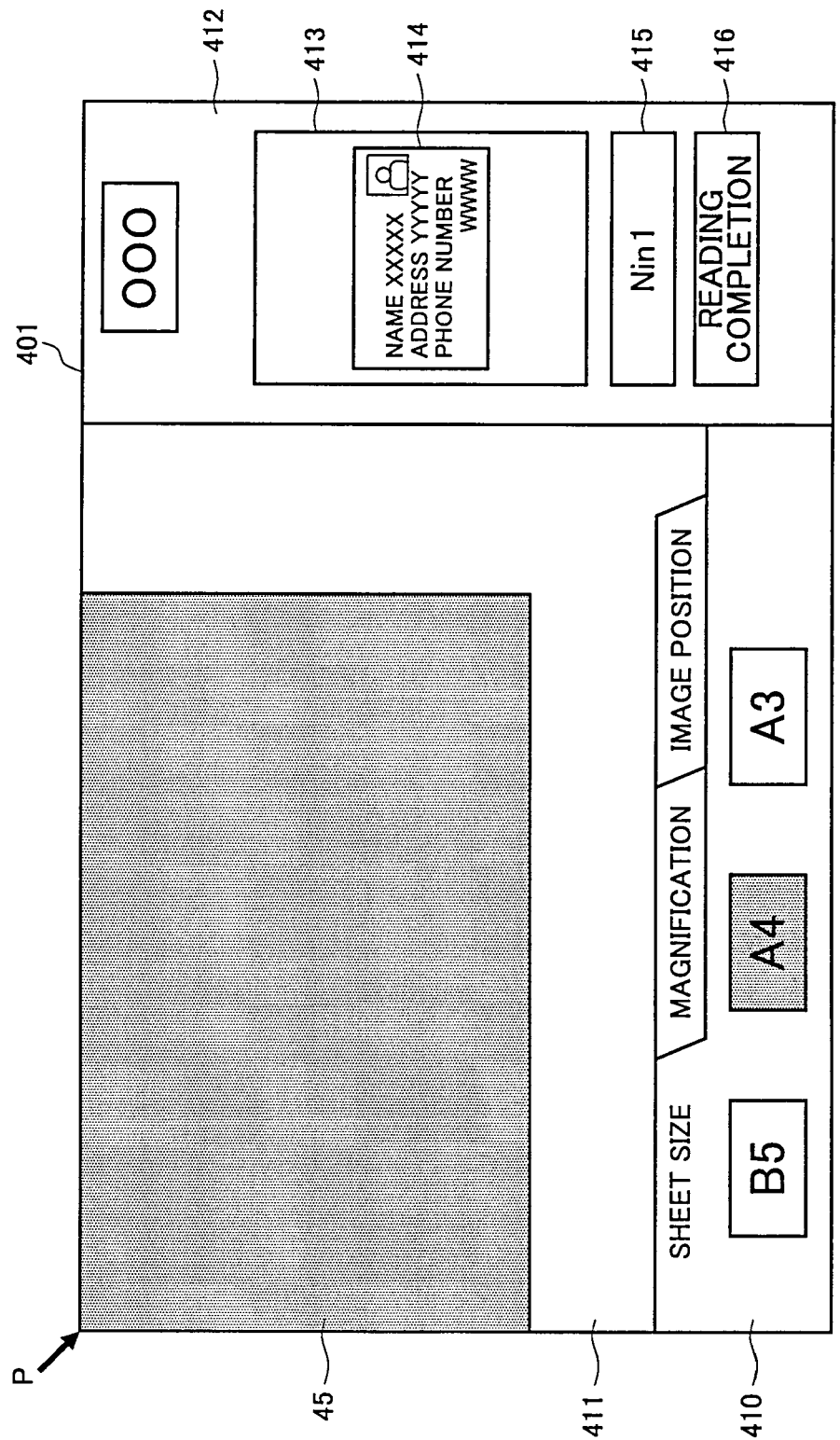

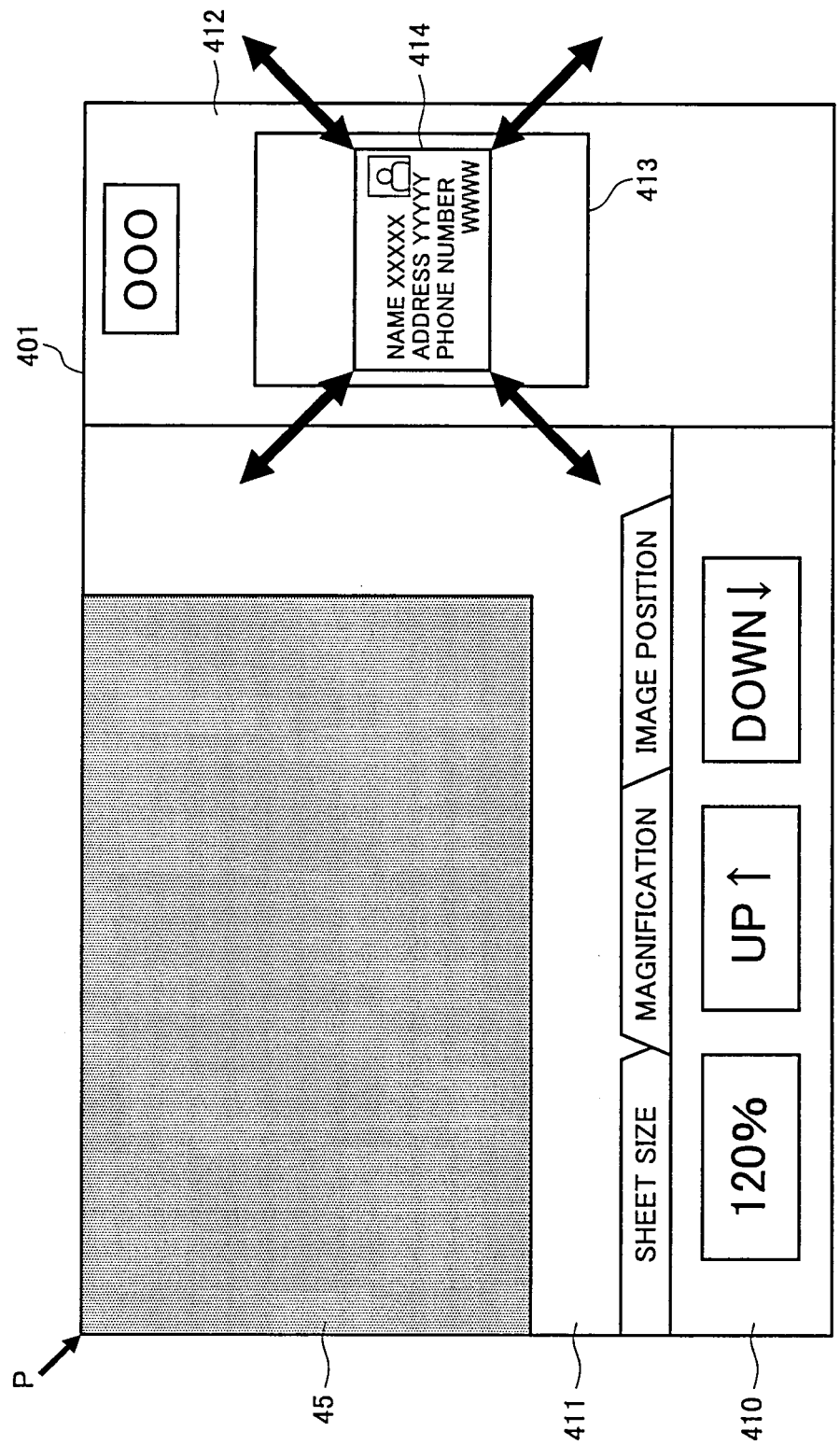

DOCUMENT READING APPARATUS HAVING A FUNCTION FOR READING A DOCUMENT ON A DISPLAY SCREEN AND IMAGE FORMING APPARATUS INCLUDING THE DOCUMENT READING APPARATUS

CROSS-NOTING PARAGRAPH

This Non-provisional application claims priority under 35 U.S.C. §119(a) on Patent Application No. 2008-030036 filed in JAPAN on Feb. 12, 2008, the entire contents of which are hereby incorporated herein by reference.

FIELD OF THE INVENTION

The present invention relates to a document reading apparatus and an image forming apparatus, and relates to a document reading apparatus having a function for reading a document on a display screen such as a liquid crystal panel, and an image forming apparatus including the document reading apparatus.

BACKGROUND OF THE INVENTION

In recent years, a digital multifunctional peripheral (MFP) having a plurality of functions including a copy function, a printer function, a facsimile function, and a scanner function has become popular. The MFP is provided with a large document platen so that documents comprising sheets of paper up to A3 size can be read normally. When performing copy with this MFP, a user closes a document cover with a document set on the document platen to execute scanning.

At this time, the document cover is closed to hide the document so that the user can not see the document. Thus, the user can leave the document set on the document platen behind carelessly after obtaining a copy. Especially, when copying a relatively small-sized document, such as a driver's license, a name card and an L-sized picture, the document is often left behind without being noticed the existence thereof.

Meanwhile, an input display in which a relatively small-sized liquid crystal panel has a function for reading a document placed on a screen in addition to a conventional display function for displaying image data on the screen attracts public attention (for example, refer to Japanese Laid-Open Patent Publication No. 2006-179977). When a portable terminal such as a PDA is mounted with this input display, a card-sized document can be easily read and captured. Note that, the input display generally employs an area sensor. The area sensor captures an image of an object through a photoelectric conversion element provided on a plane as electric signal and therefore does not need to scan the photoelectric conversion element as it is different from a line sensor and it does not need a motor and the like for scanning.

An operation portion of the MFP is generally provided with a liquid crystal display portion with a touch panel in many cases. Since this portion is directly operated by a user, it is said that this portion catches user's eye most often. When the above-mentioned reading function is provided in the liquid crystal display portion, it is possible to read and capture a relatively small-sized document such as a driver's license. In this case, it is not necessary to set a document on a document platen each time, thus making it possible to easily read the document, further, since the liquid crystal display portion catches user's eye most often, it becomes possible to prevent the document from being left behind.

However, in the conventional technique including the technique described in Japanese Laid-Open Patent Publication No. 2006-179977, since it is not considered to use the input display in combination with the MFP, the document can not be read on a liquid crystal display portion of the MFP.

Furthermore, in a normal operation of the MFP, in order to accept a user operation by displaying various operation keys on a screen of the liquid crystal display portion, it is necessary to switch the liquid crystal display portion from a document reading mode to a user operation mode, however, the conventional technique can not switch between the two modes.

SUMMARY OF THE INVENTION

An object of the present invention is to provide a document reading apparatus which prevents a document from being left behind by reading the document on a display screen of an operation panel using an area sensor, and to enable automatic switching between a document reading mode and a user operation mode.

Another object of the present invention is to provide a document reading apparatus comprising: a display portion integrally provided with an area sensor; and a control portion for detecting, by the area sensor, reflection light from an object placed on a screen of the display portion; wherein the control portion determines whether or not the object is a document based on an area of reflection light from the object, and when determined as a document, setting a document reading mode for reading the document placed on the screen by the area sensor.

Another object of the present invention is to provide the document reading apparatus, wherein the control portion determines whether the object is a document or a finger of a user based on the area of reflection light from the object, and when determined as a finger of a user, receiving a user operation by the area sensor.

Another object of the present invention is to provide the document reading apparatus, wherein the control portion sets, on the screen of the display portion, a reading area for reading a document and an operation area for displaying an operation key of the document reading apparatus.

Another object of the present invention is to provide the document reading apparatus, wherein the display portion has, on the screen, an operation area for displaying an operation key of the document reading apparatus, and when the control portion determines that the object is a document, setting an area other than an area having the document placed thereon as the operation area.

Another object of the present invention is to provide the document reading apparatus, wherein the control portion displays, on the operation area of the document reading apparatus, an operation key for confirming whether to switch to a N-up mode for putting a plurality of documents in a single page together.

Another object of the present invention is to provide the document reading apparatus, wherein the control portion displays a preview image of the document on the operation area of the document reading apparatus.

Another object of the present invention is to provide the document reading apparatus, wherein the display portion displays the preview image of the document as an image formed on recording paper with a size specified by a user, and the control portion is capable of moving a position of the preview image in the image in accordance with a user operation.

Another object of the present invention is to provide the document reading apparatus, wherein the display portion displays the preview image of the document as an image formed on recording paper with a size specified by a user, and the control portion is capable of changing a magnification of the preview image in the image in accordance with a user operation.

Another object of the present invention is to provide the document reading apparatus, wherein the display portion displays the preview image of the document as an image formed on recording paper with a size specified by a user, and displays a menu so that a candidate of the position of the preview image in the image is capable of being selected by a user, and the control portion is capable of moving the position of the preview image in the image in accordance with selection by the user in the menu.

Another object of the present invention is to provide the document reading apparatus, wherein the display portion displays the preview image of the document as an image formed on recording paper with a size specified by a user, and displays a menu so that a candidate of the magnification of the preview image in the image is capable of being selected by a user, and the control portion is capable of changing the magnification of the preview image in the image in accordance with selection by the user in the menu.

Another object of the present invention is to provide the document reading apparatus, wherein a rectangular area is set to read an image within the rectangular area, the rectangular area has a set of diagonal points which is a set of light receiving elements each having a maximum coordinate and a minimum coordinate among the light receiving elements of the area sensors having detected reflection light from the document.

Another object of the present invention is to provide the document reading apparatus, wherein the display portion functions as a touch panel by the area sensor, and the control portion detects a touch operation on an area where the document is not placed, in a state where the document is placed on the screen of the display portion.

Another object of the present invention is to provide the document reading apparatus, wherein the control portion specifies a document placement area and an a non-placement area on the screen of the display portion to change a display of the document placement area thus specified to a display in a uniform single color.

Another object of the present invention is to provide an image forming apparatus comprising the document reading apparatus described above.

BRIEF DESCRIPTION OF THE DRAWINGS

FIGS. 5A and 5B are views showing an example of the detailed structure of an operation panel;

FIGS. 6A through 6C are views showing an example of a screen displayed by the integral display portion provided with an area sensor;

FIGS. 12A and 12B are views showing another example of a screen displayed by the integral display portion provided with the area sensor.

PREFERRED EMBODIMENTS OF THE INVENTION

The preferred embodiments of a document reading apparatus and an image forming apparatus including the document reading apparatus of the present invention will hereinafter be described referring to the accompanying drawings.

Figure 1:
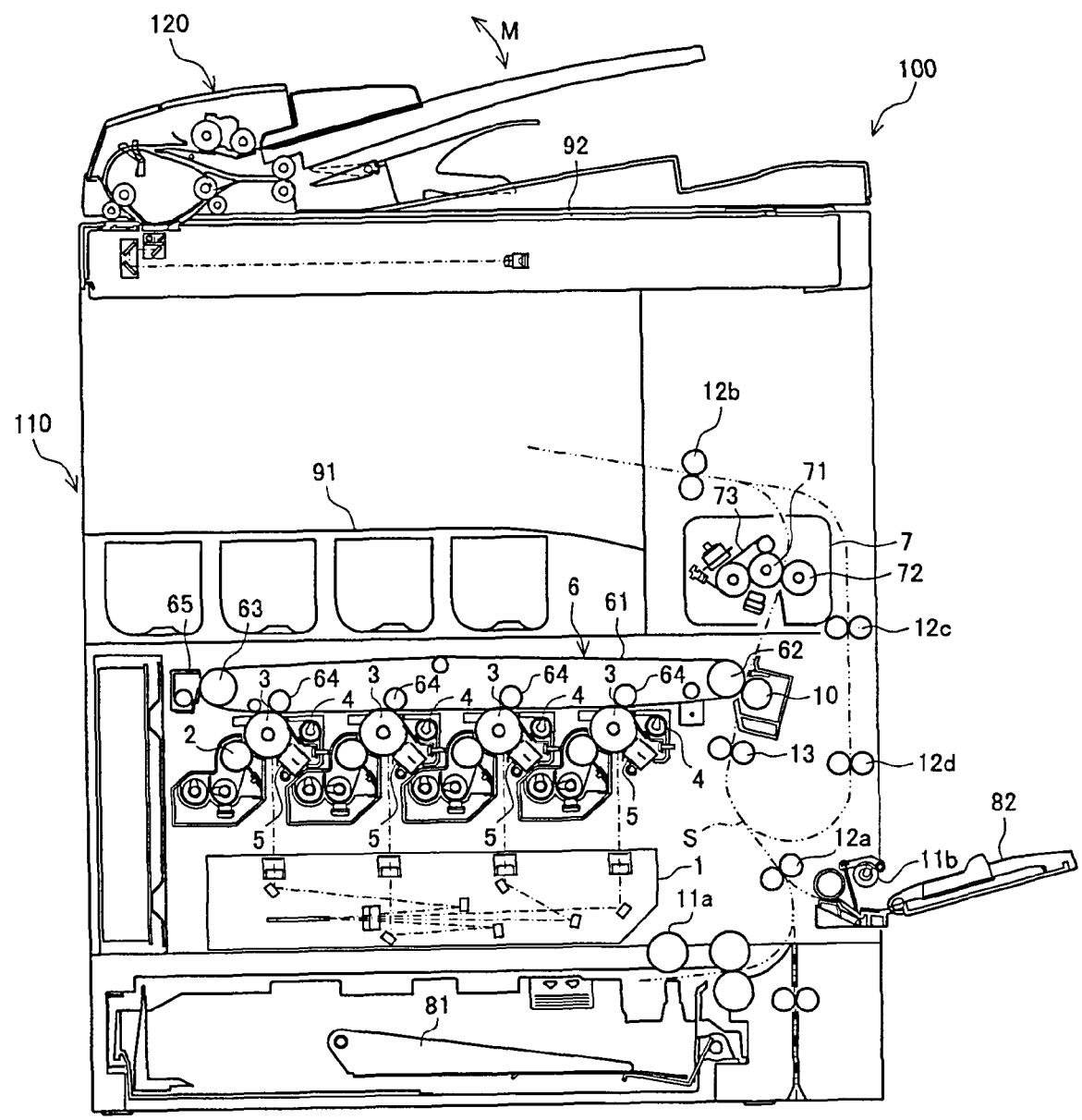
FIG. 1 is a view showing a structural example of an image forming apparatus according to an embodiment of the present invention.

FIG. 1 is a view showing a structural example of an image forming apparatus according to an embodiment of the present invention, where 100 denotes the image forming apparatus. The image forming apparatus 100 forms multicolor and single color images on predetermined sheets (recording paper) in response to image data transmitted from an external portion and is composed of an apparatus main body 110 and an automatic document feeder 120.

The apparatus main body 110 is composed of an exposure unit 1, development devices 2, photoreceptor drums 3, cleaner units 4, charging devices 5, an intermediate transfer belt unit 6, a fixing unit 7, a paper feeding cassette 81, a paper discharge tray 91, and the like.

On the upper part of the apparatus main body 110, a document platen 92 made of transparent glass on which a document is placed is provided, and the automatic document feeder 120 is attached on the upper side of the document platen 92. The automatic document feeder 120 automatically feeds a document on the document platen 92. In addition, the automatic document feeder 120 is constituted so as to be rotatable in the direction indicated by an arrow M and a document can be manually placed on the document platen 92 by opening an upper part of the document platen 92.

Image data handled by the image forming apparatus 100 corresponds to a color image that uses colors of black (K), cyan (C), magenta (M), and yellow (Y). Consequently, four pieces are provided respectively for the development device 2, the photoreceptor drum 3, the charging device 5, and the cleaner unit 4, such that four types of latent images corresponding to respective colors can be formed, and are respectively set for black, cyan, magenta, and yellow, which constitute four image stations.

The charging device 5 is a charging means for charging a surface of the photoreceptor drum 3 uniformly to a predetermined voltage and the contact type such as roller type or brush type charging device may be used, in addition to the charger type as shown in FIG. 1.

The exposure unit 1 is constituted as a laser scanning unit (LSU) including a laser irradiating portion, a reflecting mirror, and the like. The exposure unit 1 is provided with a polygon mirror for scanning laser beam, and optical elements such as lenses and mirrors for guiding laser light reflected by the polygon mirror to the photoreceptor drums 3. The structure of the optical scanning device constituting the exposure unit 1 will be described in detail below. The exposure unit 1 may also use, for example, an EL or LED writing head in which light emitting elements are arranged in an array.

The exposure unit 1 has a function for exposing the charged photoreceptor drums 3 depending on input image data to form electrostatic latent images corresponding to the image data on the surfaces thereof. The development device 2 visualizes the electrostatic latent image formed on each photoreceptor drum 3 with toner of four colors (YMCK). Moreover, the cleaner unit 4 removes and collects toner remained on the surface of the photoreceptor drum 3 after development and image transfer.

The intermediate transfer belt unit 6 disposed above the photoreceptor drums 3 includes an intermediate transfer belt 61, an intermediate transfer belt driving roller 62, an intermediate transfer belt driven roller 63, intermediate transfer rollers 64, and an intermediate transfer belt cleaning unit 65. Four intermediate transfer rollers 64 are provided corresponding to respective colors of YMCK.

The intermediate transfer belt 61 is rotationally driven in a tensioned state by the intermediate transfer belt driving roller 62, the intermediate transfer belt driven roller 63, and the intermediate transfer rollers 64. In addition, each of the intermediate transfer rollers 64 applies a transfer bias for transferring the toner images on the photoreceptor drums 3 onto the intermediate transfer belt 61.

The intermediate transfer belt 61 is arranged so as to come in contact with each of the photoreceptor drums 3, and has a function for forming a color toner image (multicolor toner image) on the intermediate transfer belt 61 by transferring the toner image of each color formed on the photoreceptor drums 3 on top of the other onto the intermediate transfer belt 61 one after another. The intermediate transfer belt 61 is formed as an endless shape, for example, using a film having a thickness of around 100 μm to 150 μm.

Transfer of the toner images from the photoreceptor drums 3 to the intermediate transfer belt 61 is carried out by the intermediate transfer rollers 64 that are in contact with a back side of the intermediate transfer belt 61. A high voltage transfer bias (a high voltage (+) that has a polarity opposite to the charging polarity (−) of the toner) is applied to the intermediate transfer rollers 64 to transfer the toner images. The intermediate transfer rollers 64 are rollers based on metal (for example stainless steel) shafts with a diameter of 8 to 10 mm and the surfaces thereof are covered by an electrically conductive elastic material (for example, EPDM and urethane foam or the like). This electrically conductive elastic material makes it possible to apply a uniform high voltage to the intermediate transfer belt 61. In the present embodiment, the rollers are used as transfer electrodes, but it is also possible to use brushes and the like.

The electrostatic image visualized on each photoreceptor drum 3 depending on each color as described above is piled up on the intermediate transfer belt 61. In this way, with the rotation of the intermediate transfer belt 61, the piled-up image information is transferred onto a sheet by a transfer roller 10, which will be described below, disposed at a contact position between the sheet and the intermediate transfer belt 61.

At this time, the intermediate transfer belt 61 is brought into press-contact with the transfer roller 10 under a predetermined nip and a voltage (a high voltage (+) that has a polarity opposite to the charging polarity (−) of the toner) is applied to the transfer roller 10 to transfer the toner to the sheet. In addition, to obtain the nip constantly by the transfer roller 10, one of the transfer roller 10 and the intermediate transfer belt driving roller 62 is made of a hard material (metal or the like) and the other is made of a soft material such as an elastic roller (elastic rubber roller, resin foam roller or the like).

Furthermore, as described above, since toner that adheres to the intermediate transfer belt 61 due to contact with the photoreceptor drums 3, or toner that is not transferred onto the sheet by the transfer roller 10 and remained on the intermediate transfer belt 61 causes color mixture of the toner at the next process, the toner is removed and collected by the intermediate transfer belt cleaning unit 65. The intermediate transfer belt cleaning unit 65 includes a cleaning blade for example as a cleaning member that touches the intermediate transfer belt 61, and the intermediate transfer belt 61 with which the cleaning blade is contact is supported from its back side by the intermediate transfer belt driven roller 63.

The paper feeding cassette 81 is a tray for storing sheets (recording paper) used for image formation and is provided on the lower side of the exposure unit 1 of the apparatus main body 110. Sheets used for image formation can be also placed on a manual paper feeding cassette 82. In addition, the paper discharge tray 91 provided on the upper side of the apparatus main body 110 is a tray for accumulating printed sheets face-down.

Moreover, the apparatus main body 110 is provided with a paper conveying path S of substantially vertical shape for sending sheets in the paper feeding cassette 81 and the manual paper feeding cassette 82 to the paper discharge tray 91 via the transfer roller 10 and the fixing unit 7. Pickup rollers 11*a* and 11*b*, a plurality of conveyance rollers 12*a* to 12*d*, a resist roller 13, the transfer roller 10, the fixing unit 7, and the like are disposed in a vicinity of the paper conveying path S from the paper feeding cassette 81 or the manual paper feeding cassette 82 to the paper discharge tray 91.

The conveyance rollers 12*a* to 12*d* are small-sized rollers for facilitating/assisting the conveyance of sheets, and a plurality of these rollers are provided along the paper conveying path S. In addition, the pickup roller 11*a* is provided near an end portion of the paper feeding cassette 81 and picks up sheets one by one from the paper feeding cassette 81 to feed to the paper conveying path S. Similarly, the pickup roller 11*b* is provided near an end portion of the manual paper feeding cassette 82 and picks up sheets one by one from the manual paper feeding cassette 82 to feed to the paper conveying path S.

The resist roller 13 temporarily holds the sheet conveyed in the paper conveying path S. The resist roller 13 also has a function for conveying the sheet to the transfer roller 10 at a timing when a leading edge of the toner image on the photoreceptor drum 3 meets a leading edge of the sheet.

The fixing unit 7 includes a heat roller 71 and a pressure roller 72, and the heat roller 71 and the pressure roller 72 rotate holding a sheet between them. In addition, the heat roller 71 is set to have a predetermined fixing temperature by a control portion based on signal from a temperature detector (not-shown) and has a function for melting/mixing/pressing the multicolor toner image transferred to the sheet to thermally fix to the sheet by performing thermocompression of toner to the sheet together with the pressure roller 72. Moreover, an external heat belt 73 is provided for externally heating the heat roller 71.

Next, the sheet conveying path will be described in detail. As has been described above, the image forming apparatus 100 is provided with the paper feeding cassette 81 and the manual paper feeding cassette 82 for previously storing sheets. In order to feed sheets from the paper feeding cassettes 81 and 82, the pickup rollers 11$a$ and 11$b$ are disposed so as to guide the sheets to the paper conveying path S one by one.

The sheet conveyed from each of the paper feeding cassettes 81 and 82 is conveyed to the resist roller 13 by the conveyance roller 12$a$ in the paper conveying path S and is conveyed to the transfer roller 10 at a timing of making a leading edge of the sheet meet a leading edge of the image information on the intermediate transfer belt 61, and the image information is then written to the sheet. Thereafter, the sheet passes through the fixing unit 7 so that unfixed toner on the sheet is thermally melted/fixed, and the sheet is discharged on the paper discharge tray 91 through the conveyance roller 12$b$ disposed behind.

The above-mentioned conveying path is for a case where single side printing is requested for the sheet, on the other hand, in a case where duplex printing is requested, when a rear end of the sheet on which the single side printing is completed and has passed through the fixing unit 7 is held by the last conveyance roller 12$b$, the conveyance roller 12$b$ is rotated in the opposite direction to guide the sheet to the conveyance rollers 12$c$ and 12$d$. After the sheet passes through the resist roller 13 and printing is executed on its back side, the sheet is discharged in the paper discharge tray 91.

Figure 2:
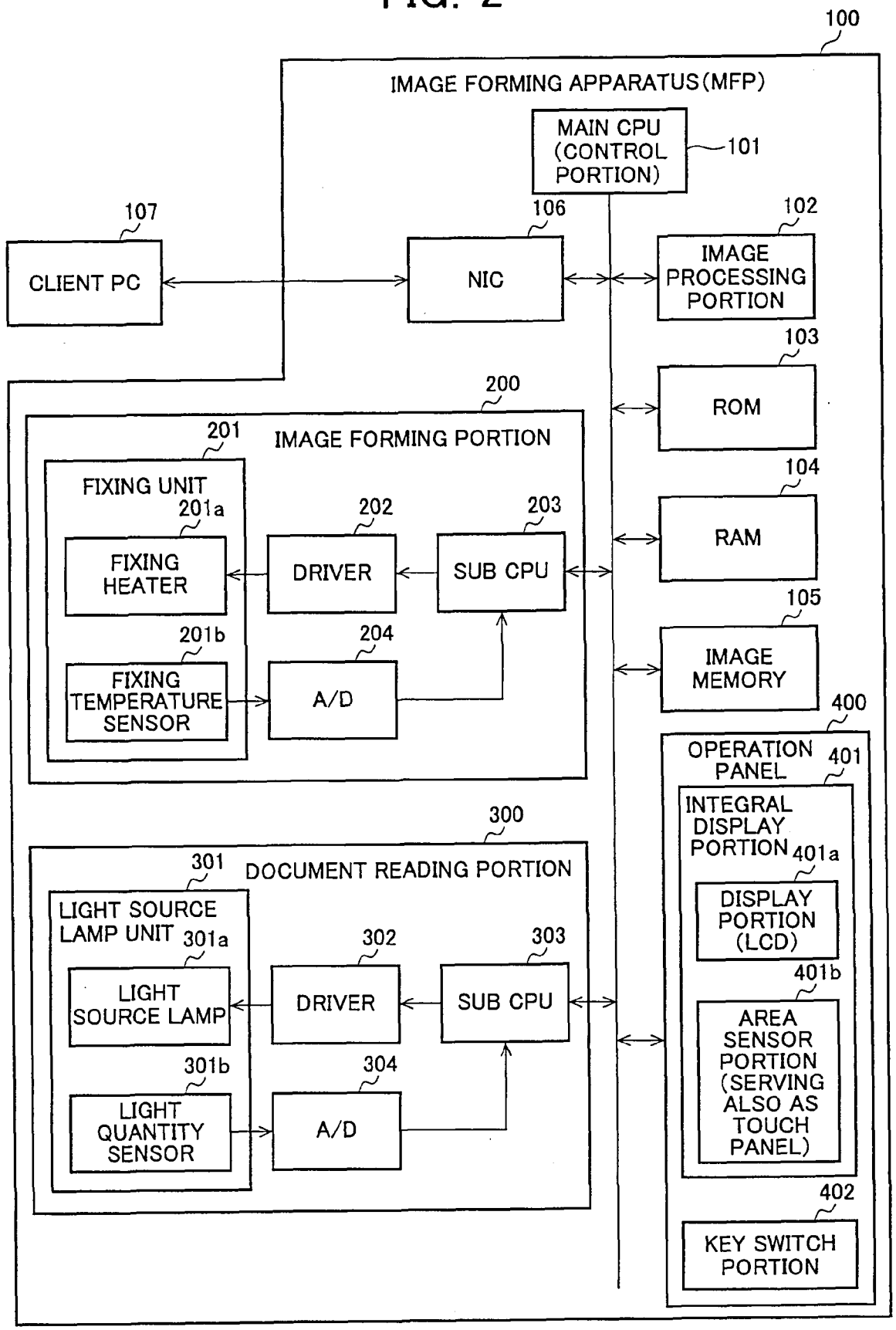
FIG. 2 is a block diagram showing a structural example of the image forming apparatus shown in FIG. 1.

FIG. 2 is a block diagram showing a structural example of the image forming apparatus 100 shown in FIG. 1. In the figure, the image forming apparatus 100 includes a main CPU 101 corresponding to a control portion of the present invention. In addition, the main CPU 101 is connected to an image processing portion 102, a ROM 103, a RAM 104, an image memory 105, an NIC 106, an operation panel 400, a sub CPU 203, and a sub CPU 303. Note that, the document reading apparatus of the present invention is composed of the main CPU 101 and an integral display portion 401 included in the operation panel 400.

The main CPU 101 integrally controls each input/output device in accordance with a program previously written into the ROM 103, and temporarily stores data input/output during this control in a predetermined memory area of the RAM 104. The image memory 105 stores image data output from the image processing portion 102. A file and a password transmitted from a client PC 107 are stored in a HDD (not-shown).

The operation panel 400 includes the integral display portion 401 corresponding to a display portion of the present invention, and a key switch portion 402, such as a ten key and a start key. The integral display portion 401 is integrally provided with a display portion 401$a$, such as a liquid crystal display (LCD), and the area sensor portion 401$b$ capable of reading a small-sized document, mainly including a name card, an ID card such as a driver's license, and an L-sized picture. Note that, the area sensor portion 401$b$ detects reflected light by a finger of a user so that a coordinate position of the finger on a screen can be specified. Accordingly, the area sensor portion 401$b$ can be also used as an optical touch panel. Moreover, the display portion 401$a$ displays the condition of the image forming apparatus 100, compatible sheet size and copying magnification and the like.

The NIC (Network Interface Card) 106 is a communication means for performing communication with the client PC 107 through a communication line. The image forming apparatus 100 performs printing based on print data transferred from the client PC 107, or transfers image data obtained from the document reading portion 300 to the client PC 107 through the NIC 106.

The image forming portion 200 is controlled by the sub CPU 203, and includes a fixing unit 201, a driver 202, and an A/D converter 204. The fixing unit 201 corresponds to the fixing unit 7 shown in FIG. 1, and includes a fixing heater 201$a$ and a fixing temperature sensor 201$b$. The fixing temperature sensor 201$b$ detects a temperature of the heat roller 71 in the fixing unit 7 of FIG. 1 to output temperature data to the sub CPU 203.

The main CPU 101 transmits a predetermined warm-up command to the sub CPU as first return processing. When receiving the predetermined warm-up command from the main CPU 101, the sub CPU 203 applies electric current to the fixing heater 201$a$, and controls energizing of the fixing heater 201$a$ so that a surface temperature of the heating roller 71 heated by the fixing heater 201$a$ can be kept constant at a predetermined temperature, based on the temperature information obtained from the fixing temperature sensor 201$b$. When a temperature of the surface of the heat roller 71 reaches the predetermined temperature, the sub CPU 203 determines that it reaches the state where processing can be performed (ready state) and notifies the main CPU 101 of the fact.

The document reading portion 300 is controlled by the sub CPU 303, and includes a light source lamp unit 301, a driver 302 and an A/D converter 304. The light source lamp unit 301 corresponds to the exposure unit 1 shown in FIG. 1, and includes a light source lamp 301$a$, and a light quantity sensor 301$b$. The light quantity sensor 301$b$ detects light quantity of light irradiated from the light source lamp 301$a$ of the light source lamp unit 301 and inputs light quantity data to the sub CPU 303.

The main CPU 101 transmits a predetermined warm-up command to a sub CPU 303 as second recovery processing. When receiving the predetermined warm-up command from the main CPU 101, the sub CPU 303 applies electric current to the light source lamp 301$a$, and controls energizing of the light source lamp 301$a$ so that light quantity of the light source lamp 301$a$ can be kept constant at predetermined light quantity, based on light quantity information obtained from the light quantity sensor 301$b$. When the light quantity of the light source lamp 301$a$ reaches the predetermined light quantity, the sub CPU 303 determines that it reaches the state ready for processing (ready state) and notifies the main CPU 101 of the fact.

The driver 302 drives the light source lamp 301$a$ of the light source lamp unit 301 based on control data output from the sub CPU 303. The driver 202 drives the fixing heater 201$a$ built in the heat roller of the fixing unit 201 based on control data output from the sub CPU 203.

In addition to the above-mentioned devices, many input/output devices that are operated in image forming processing and document reading processing, including a motor, a clutch, a solenoid, and a sensor included in the image forming portion and the document reading portion, are connected to the sub CPU 203 and the sub CPU 303. In the image forming processing and the document reading processing, each of the sub CPU 203 and the sub CPU 303 reads the detected data by a sensor at a predetermined timing to drive a motor and the like depending on the detected data.

The primary characteristic of the present invention is to prevent a document from being left behind by reading the document on the display screen of the operation panel using the area sensor, and to enable automatic switching between a document reading mode and a user operation mode. In order to attain this, the document reading apparatus comprises the integral display portion 401 integrally provided with the area sensor portion 401$b$ and the main CPU 101 for controlling screen display on the integral display portion 401, in which reflection light from an object placed on the screen of the integral display portion 401 is detected by the area sensor portion 401b. The main CPU 101 determines whether or not the object is a document based on an area of the reflection light from the object detected by the area sensor portion 401b, and when determined that it is a document, a document reading mode for reading the document placed on the screen by the area sensor portion 401b is set.

Figure 3:
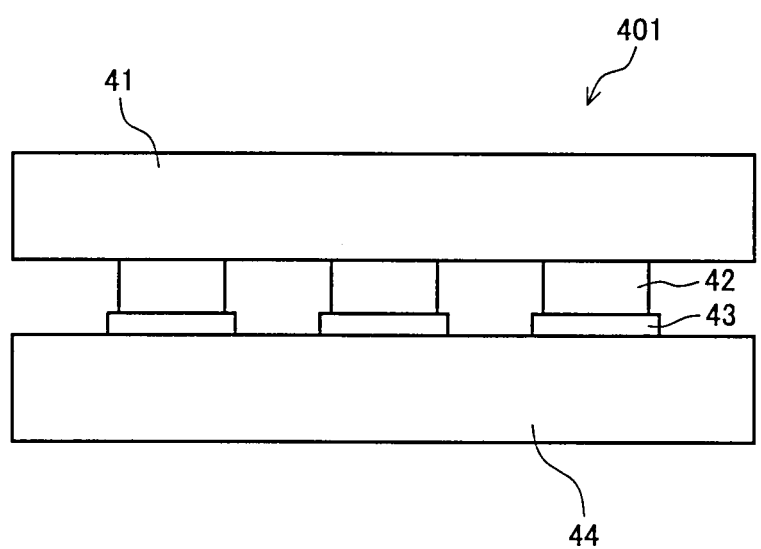
FIG. 3 is a view showing an example of the structure of an integral display portion according to the present invention.

FIG. 3 is a view showing an example of the structure of the integral display portion 401 according to the present invention, where 41 denotes a liquid crystal layer, 42 denotes an optical sensor, 43 denotes a light shielding layer, and 44 denotes a backlight light source. The area sensor portion 401b is composed of a plurality of micro optical sensors 42 that are uniformly disposed on an XY plane, and is positioned between the liquid crystal layer 41 of the display portion 401a and the backlight light source 44. As the optical sensor 42, for example, a photodiode is used. Moreover, the optical sensor 42 is provided with the light shielding layer 43 so that no light from the backlight light source 44 can enter. When an object touches a surface of the liquid crystal layer 41, the light from the backlight light source 44 is reflected from the contacted object and is incident upon the optical sensor 42, and thereby an image shape of the object is output as image data.

Note that, in FIG. 3, the optical sensor 42 and the backlight light source 44 are disposed, for example, based on a well-known method (Japanese Laid-Open Patent Publication No. 2004-153327 and the like). Each of the optical sensors has a minute area and gaps with sufficient width are actually formed between the optical sensors. In addition, backlight light is irradiated and diffused through the gaps, thus the liquid crystal display is not affected even when the optical sensors 42 are arranged like in FIG. 3.

Figure 4:
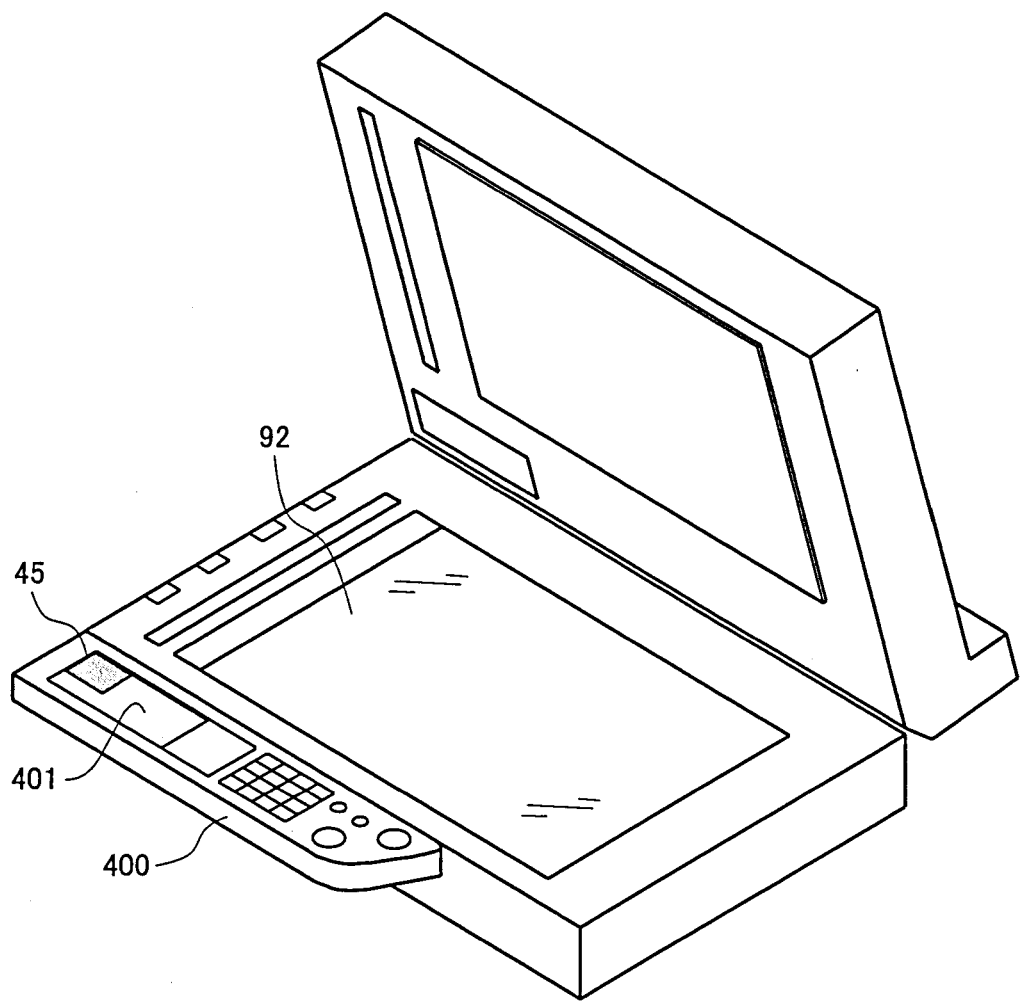
FIG. 4 is a view showing an external view of a document reading apparatus provided with the integral display portion which is characteristic of the present invention.

FIG. 4 is a view showing an external view of the document reading apparatus provided with the integral display portion 401 which is a characteristic part of the present invention. The document reading apparatus has the operation panel 400 provided with the integral display portion 401, and is capable of reading a small-sized document 45 such as a driver's license and a name card set on the screen of the integral display portion 401 by the area sensor portion 401b.

Figure 5A:
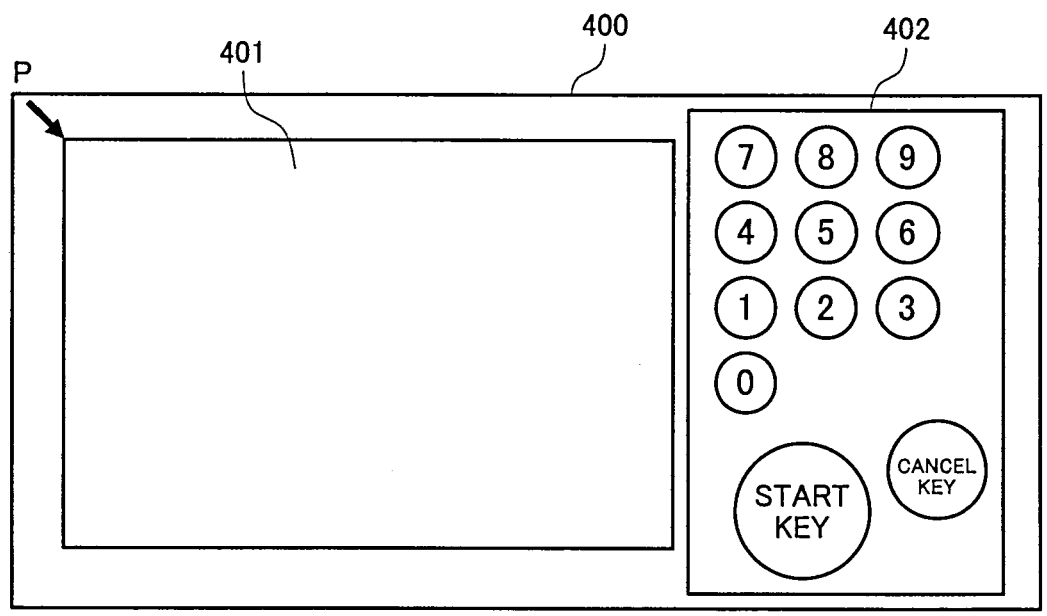

FIGS. 5A and 5B are views showing an example of the detailed structure of the operation panel 400. FIG. 5A is an overall schematic view of the operation panel 400. FIG. 5B shows an example of an initial screen of the integral display portion 401. In the figure, P denotes a document positioning index point.

In FIG. 5A, the operation panel 400 includes the integral display portion 401 and the key switch portion 402. A user uses the point P on the screen of the integral display portion 401 as an index point when he/she sets the document 45 and the user can start reading the document 45 by pressing a "start key" of the key switch portion 402.

In FIG. 5B, the main CPU 101 sets a reading area 411 for reading a document and an operation area for displaying a menu tab 410 of the document reading apparatus on the screen of the integral display portion 401. This example shows a case where the reading area is previously displayed on the display screen. When a user desires to read the document 45 by the integral display portion 401, the user places the document 45 on the reading area 411 where a "small-sized document reading area" is displayed. Moreover, the menu tab 410 is displayed on the lower part of the reading area 411, and setting items of operation keys are displayed on the menu tab 410 in the state of ready for switching tab. In the tab of "detailed setting", setting for post processing, single side/duplex, collecting (N-up) and an image position is performed.

Figure 6C:
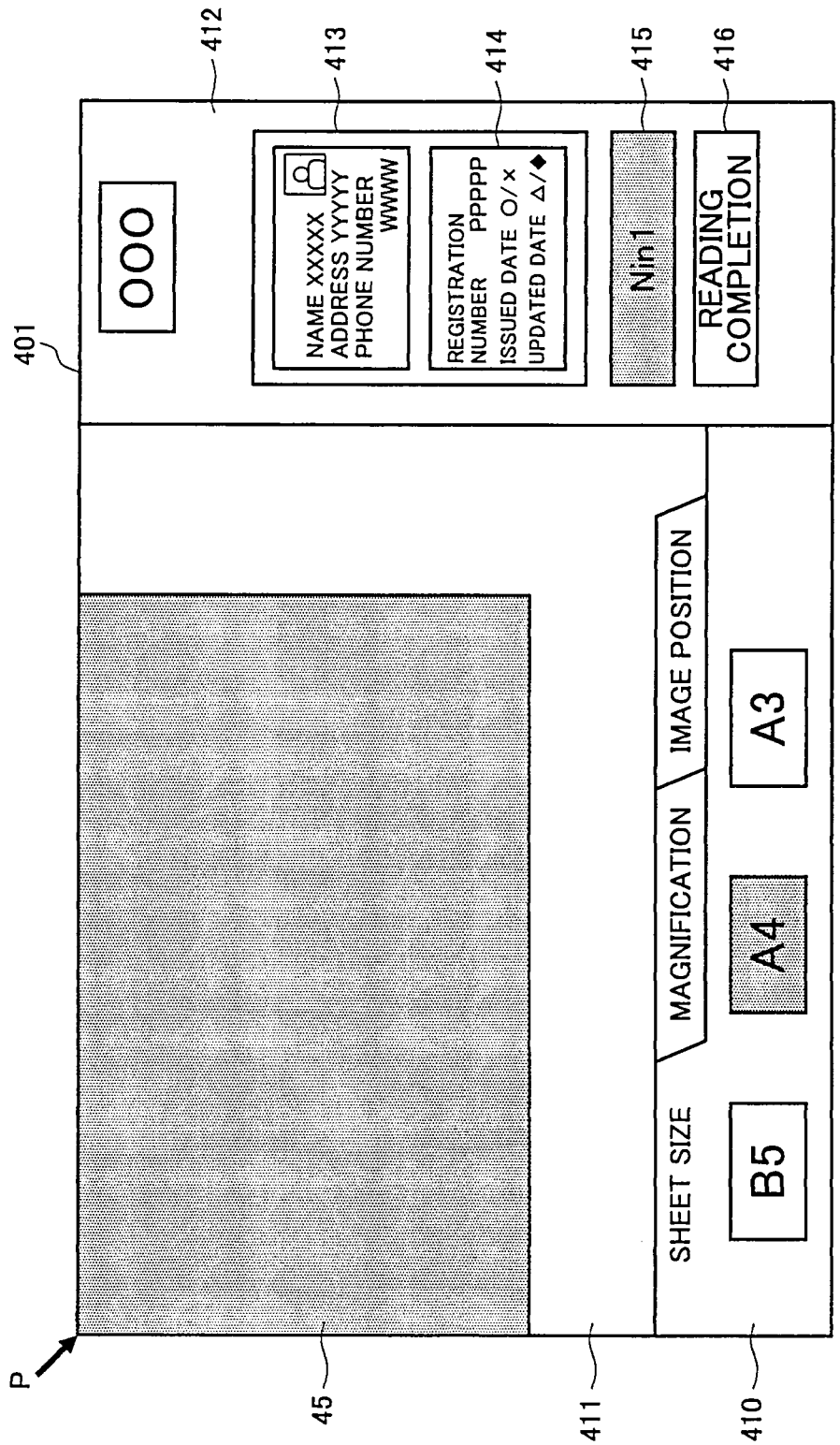

FIGS. 6A through 6C are views showing an example of a screen displayed by the integral display portion 401 provided with the area sensor. FIG. 6A shows an example of a screen right after a small-sized document is placed, FIG. 6B shows an example of a screen after the start key is pressed in the state of FIG. 6A and reading processing is executed, and FIG. 6C shows an example of a screen after an N in 1 key is pressed in the state of FIG. 6B. In the figures, 412 denotes a preview area, 413 denotes an external form of a sheet, 414 denotes a preview (thumbnail) image, 415 denotes an N in 1 key, and 416 denotes a reading completion key.

When a user places the document 45 on the reading area 411 shown in FIG. 5B, the area sensor portion 401b of the integral display portion 401 detects the fact and the screen display is shifted to that shown in FIG. 6A.

In FIG. 6A, when the document reading apparatus detects that the document 45 is placed on the screen, it shifts a reading mode to a "small-sized document reading mode". When it is switched over to this mode, the display portion 401a displays an expression showing that the "small-sized document reading mode" is set, for example, a message of "press start button to read small-sized document". Note that, with switching of the mode, a right-side item in the menu tab 410 is changed from "detailed setting" to "image position".

In FIG. 6B, for example, the preview area 412 and the like are displayed on the operation area including the menu tab 410, and the external form of the sheet 413 (herein A4 size) and the thumbnail image 414 of the document 45 are displayed on the preview area 412. Note that, the thumbnail image 414 is displayed after reading of the document 45 is completed. The document reading processing is performed when the document 45 is set on the screen and the "start key" of the operation panel 400 is pressed.

As shown in FIG. 6A, when the user presses the "start key" of the key switch portion 402 provided on the operation panel 400 with the document 45 set on the screen, the processing of reading the document 45 is started by the area sensor portion 401b. The thumbnail image 414 of the image data of the document 45 read by the area sensor portion 401b is displayed as a preview on the preview area 412, as shown in FIG. 6B. Note that, the external form of the sheet 413 is selected as A4 size, and the thumbnail image 414 is displayed at a center of a rectangle of the external form of the sheet.

Here, the N in 1 key 415 is an operation key for confirming whether or not switching to a collecting (N-up) mode for putting a plurality of documents in a single page together. When a user presses the N in 1 key 415, the document reading apparatus waits for placement of an additional document (including a back side of a document). When the user sets an additional document and presses the "start key", then the area sensor portion 401b reads the additional document and the display portion 401a displays it on the preview area 412 for a preview. This processing is repeated as many times as the number (N number) of additional documents. FIG. 6C shows the situation at this time. Here, the N in 1 key 415 is displayed in gray to show that it is in the N-up (N in 1) mode.

Here, based on an area of the reflection light from the object detected by the area sensor portion 401b, the main CPU 101 determines whether the object is a document or a finger of the user, and when it is determined that it is a finger of the user and shifts the mode to a user operation mode for accepting a user operation by the area sensor portion 401b. This will be described referring to FIGS. 7A and 7B below.

Figure 7A:
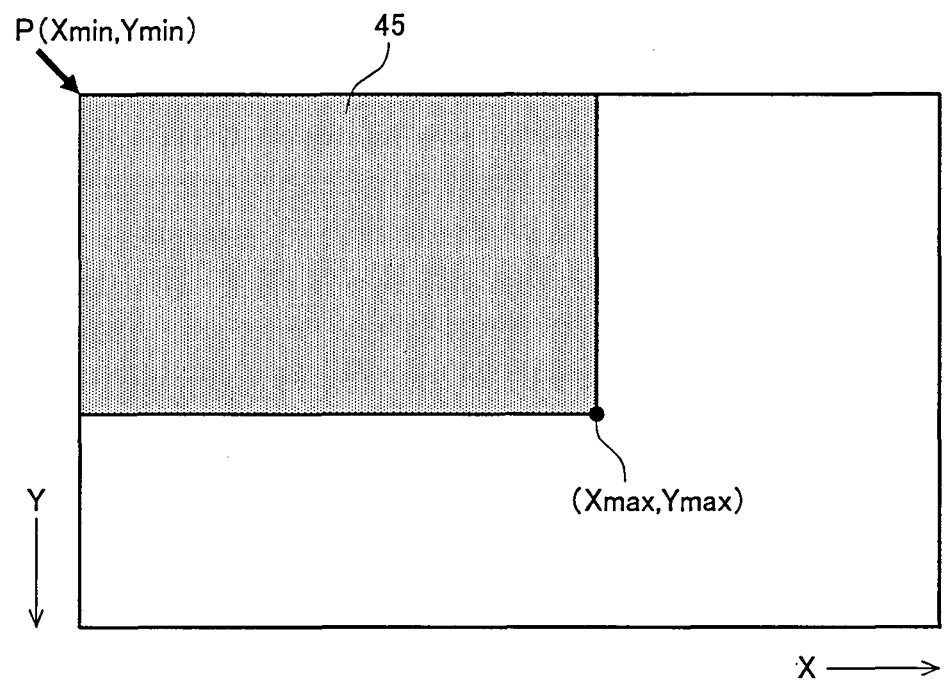
FIGS. 7A and 7B are views showing an example of the image reading state when reflection light is detected in the area sensor portion of the integral display portion.
Figure 7B:
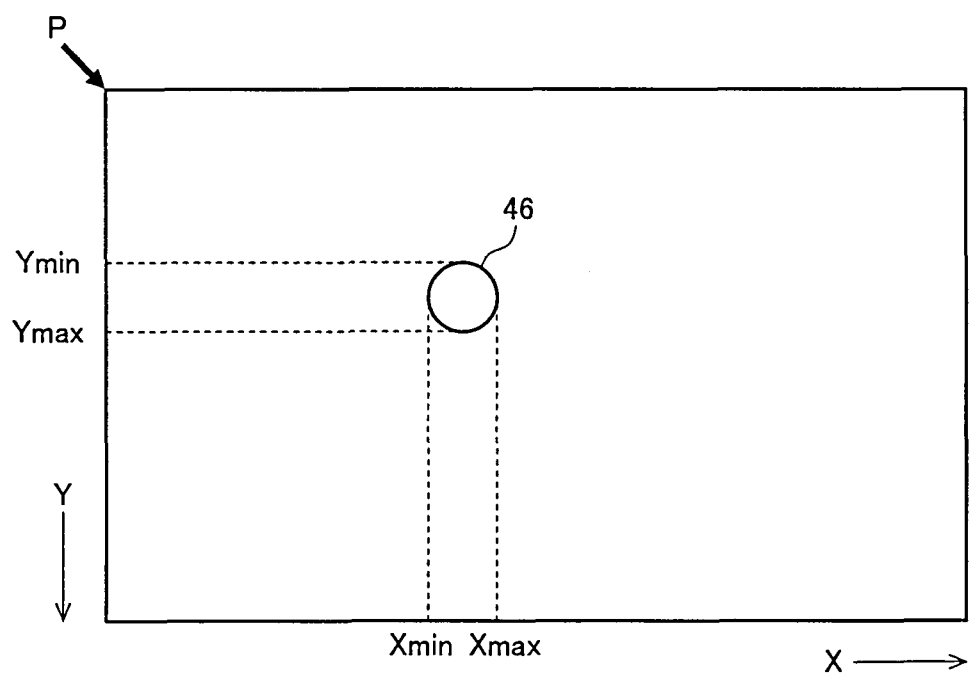

FIGS. 7A and 7B are views showing an example of the image reading state when reflection light is detected in the area sensor portion 401b of the integral display portion 401. For all light receiving elements that detected reflection light of the area sensor portion 401b, the main CPU 101 calculates maximum values (X max, Y max) and minimum values (X min, Y min) of X coordinates and Y coordinates of the light receiving elements. FIG. 7A shows a state where the document 45 is read. Moreover, FIG. 7B shows a state where a finger 46 of a user is touched and reflection light from the finger 46 is read.

When the difference between X coordinates (X max, X min) and the difference between Y coordinates (Y max, Y min) in the light receiving elements having detected reflection light are larger than predetermined values Xth and Yth, the document reading apparatus determines that the document 45 is placed on the area sensor portion 401b and shifts a document reading mode to the "small-sized document reading mode" to read the document 45 by the area sensor portion 401b of the integral display portion 401. On the other hand, when the difference between X coordinates (X max, X min) and the difference between Y coordinates (Y max, Y min) are smaller than the predetermined values Xth and Yth, it is determined that the finger 46 is placed and accept that as a normal operation input by a user and a document reading operation is performed from the document platen/SPF.

Figure 8:
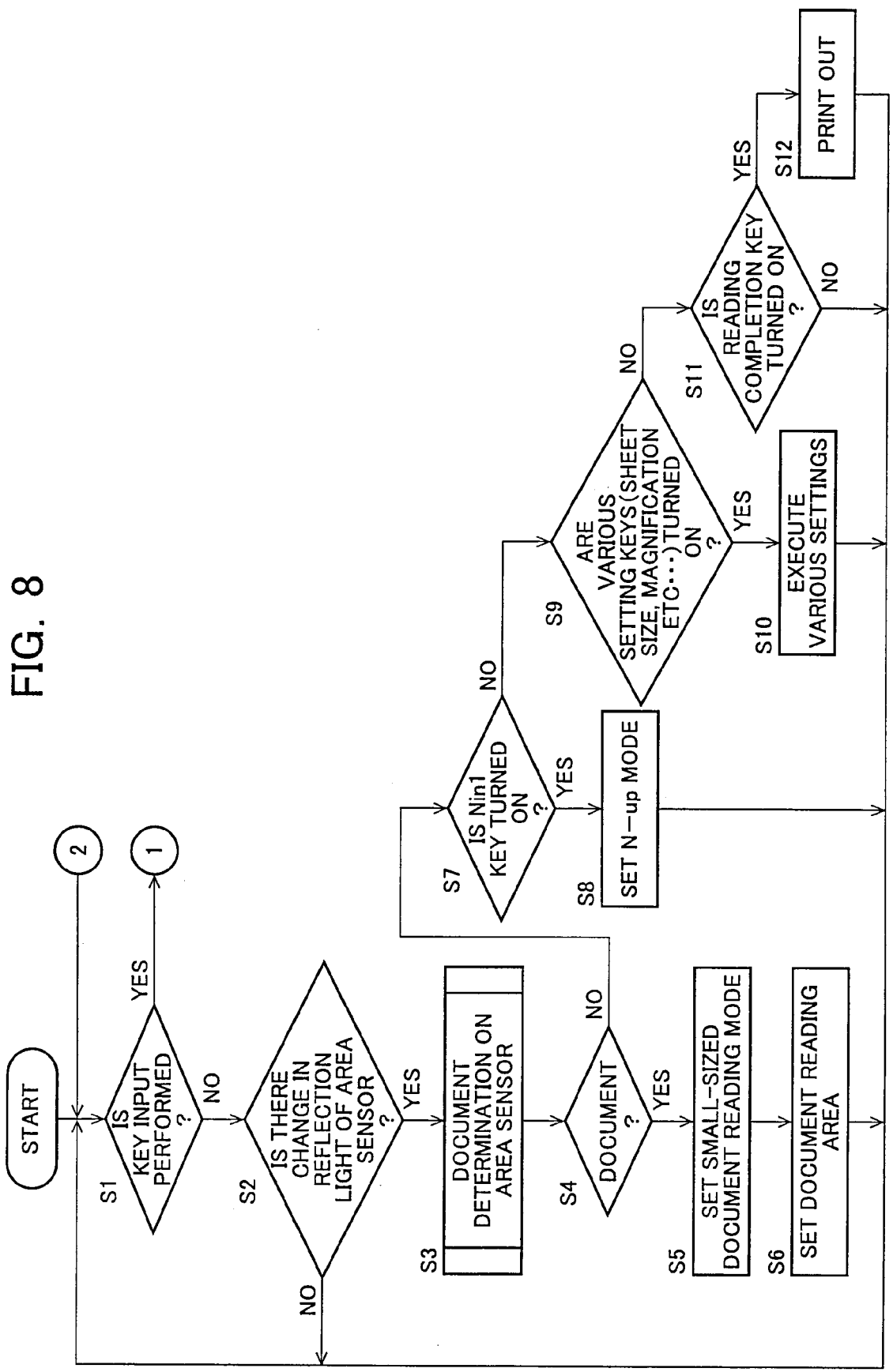
FIG. 8 is a flowchart illustrating an example of processing by a main CPU included in the document reading apparatus of the present invention.
Figure 9:
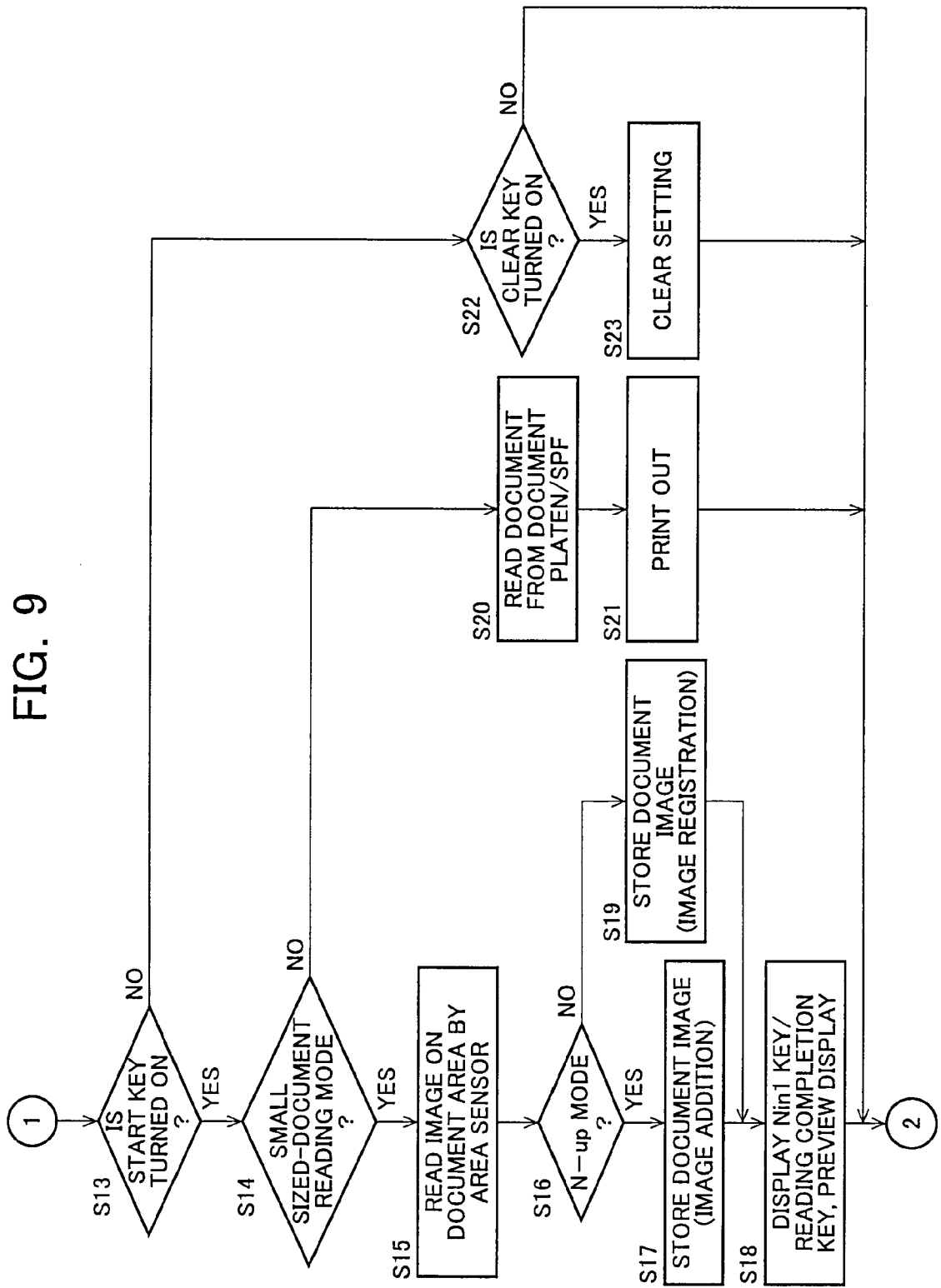
FIG. 9 is a flowchart, subsequent to that shown in FIG. 8, illustrating an example of processing by the main CPU included in the document reading apparatus of the present invention.

FIGS. 8 and 9 are flowcharts illustrating an example of processing by the main CPU 101 included in the document reading apparatus of the present invention, and FIG. 9 is a flowchart subsequent to that shown in FIG. 8.

In FIG. 8, first, the main CPU 101 determines the presence of key input to the key switch portion 402 (step S1). When key input is performed (in the case of YES at step S1), the procedure proceeds to step S13 in FIG. 9. Alternatively, when no key input is performed (in the case of NO at step S1), whether or not any of light receiving elements of the area sensor portion 401b detects any change in reflection light is determined (step S2). Here, when there is a change in output of the reflection light, it is determined that a document is placed or a touch operation is performed. When the change in the reflection light is detected (in the case of YES at step S2), whether or not a document is placed on the area sensor portion 401b is determined (step S3). Alternatively, when no change in the reflection light is detected (in the case of NO at step S2), the procedure returns to step S1 to repeat the processing.

When it is determined that a document is placed on the area sensor portion 401b (in the case of YES at step S4), the main CPU 101 sets the "small-sized document reading mode" and changes a display on the display screen of the integral display portion 401 as shown in FIG. 6A (step S5), and sets a document reading area (step S6). Note that, an area inside a rectangular which has maximum values and minimum values of X coordinates and Y coordinates (X max, Y max, X min, and Y min) of the light receiving elements that received reflection light as the opposite angles is set as the document reading area.

Alternatively, when it is determined that no document is placed on the area sensor portion 401b (in the case if NO at step S4), the main CPU 101 determines that a touch operation is performed and determines whether or not a center position between maximum values and minimum values of X coordinates and Y coordinates (X max, Y max, X min, and Y min) is included in a display area of the N in 1 key (step S7). Here, when the center position between maximum values and minimum values of X coordinates and Y coordinates is included in the display area of the N in 1 key (in the case of YES at step S7), the N-up (N in 1) mode is set (step S8).

Alternatively, when the center position between maximum values and minimum values of X coordinates and Y coordinates is not included in the display area of the N in 1 key (in the case of NO at step S7), it is determined whether or not the center position between maximum values and minimum values of X coordinates and Y coordinates (X max, Y max, X min, and Y min) is included in display areas of various setting keys (sheet size, magnification, and the like) (step S9). Here, when the center position between maximum values and minimum values of X coordinates and Y coordinates is included in the display areas of various setting keys (in the case of YES at step S9), various settings are performed (step S10).

Alternatively, when the center position between maximum values and minimum values of X coordinates and Y coordinates is not included in the display areas of various setting keys (in the case of NO at step S9), it is determined whether or not the center position between maximum values and minimum values of X coordinates and Y coordinates (X max, Y max, X min, and Y min) is included in a display area of the reading completion key (step S11). Here, when the center position between maximum values and minimum values of X coordinates and Y coordinates is included in the display area of the reading completion key (in the case of YES at step S11), a stored original image is printed out in accordance with the setting mode (step S12). Alternatively, when the center position between maximum values and minimum values of X coordinates and Y coordinates is not included in the display area of the reading completion key (in the case of NO at step S11), the procedure returns to step S1 to repeat the processing.

Note that, copying processing in the "small-sized document reading mode" is started when the reading completion key is turned ON, and when the start key is turned ON in the "small-sized document reading mode", document reading and preview display are performed.

Here, the integral display portion 401 functions also as a touch panel by means of the area sensor portion 401b, as described above. In a state where a document is placed on the screen of the integral display portion 401, the main CPU 101 may detect a touch operation on an area where the document is not placed. This makes it possible to perform various operations for the apparatus with the document placed on the display screen (touch panel), thus making it possible to improve the operability.

In FIG. 9, in the case of YES at step S1 shown in FIG. 8 (when there is key input), the main CPU 101 determines whether or not the start key is turned ON (step S13). When it is determined that the start key is turned ON (in the case of YES at step S13), whether or not a document reading mode is the "small-sized document reading mode" is determined (step S14). When it is determined that the document reading mode is the "small-sized document reading mode" (in the case of YES at step S14), a display of the screen corresponding to the document reading area set at step S6 is made in a uniform single color, irradiation light irradiated on the document is uniformed, and the document on the document reading area set at step S6 is read by the area sensor portion 401b and the read original image is stored (step S15). Note that, the display in the uniform single color needs to be in white in the case of color reading, but is not necessarily in white in the case of monochrome reading.

In this way, the main CPU 101 is capable of specifying a document placing area (that is, the document reading area above) and a not placing area on the screen of the integral display portion 401 to change a display of the specified document placing area to a display in a uniform single color. When characters and the like are displayed on the display portion, irradiation light to a part of the document corresponding to the characters is decreased, and therefore the display in the document placing area is made in a single color to prevent occurrence of unevenness of the brightness in an image that is read by uniformly irradiating the document.

Subsequently, the main CPU 101 determines whether or not the N-up (N in 1) mode is set (step S16), and when the N-up (N in 1) mode is set (in the case of YES at step S16), the original image read by the area sensor portion 401b is stored as an additional page to previously stored original images (step S17). Then, the N in 1 key and the reading completion key are displayed as well as the output state (preview) when the printing is performed based on the image data that has been read and the setting mode is displayed (step S18). For example, in the case of the N-up (N in 1) mode, the total number of read original images is set as N number (document pages) in N-up (N in 1), and all original images are collected on one sheet, and the collected image is displayed as a preview as shown in FIG. 6c.

Alternatively, when the N-up (N in 1) mode is not set (in the case of NO at step S16), the original image read by the area sensor portion 401b is stored (step S19) and the procedure shifts to step S18. Note that, in this case, it is not in the N-up (N in 1) mode, and therefore when there is a original image stored already, the stored original image is cleared. Then, the procedure returns to step S1 in FIG. 8 to repeat the processing.

In addition, in the case where the main CPU 101 determines that it is not in the "small-sized document reading mode" (in the case of NO at step S14), when it is detected by a document sensor (not shown) that a document is placed on the automatic document feeder (SPF) 120, the main CPU 101 performs conveyance and reading of the document using the automatic document feeder 120, and otherwise, it performs reading of the document on the document platen 92 (step S20). Then, the read original image is printed out (step S21), and the procedure returns to step S1 in FIG. 8 to repeat the processing.

In addition, when it is determined that the start key is not turned ON (in the case of NO at step S13), the main CPU 101 determines whether or not the clear key is turned ON (step S22), and when it is determined that the clear key is turned ON (in the case of YES at step S22), it clears the setting (step S23). Alternatively, when it is determined that the clear key is not turned ON (in the case of NO at step S22), the procedure returns to step S1 in FIG. 8 to repeat the processing.

Note that, in the flowchart above, although the processing is performed so that confirmation input for confirming the N-up (N in 1) is accepted, both sides of a driver's license and the like are often printed collectively on one side of a paper, thus, in a case where the N-up (N in 1) mode is frequently used, the N-up (N in 1) mode may be previously set in the case of the small-sized document reading mode.

Figure 10:
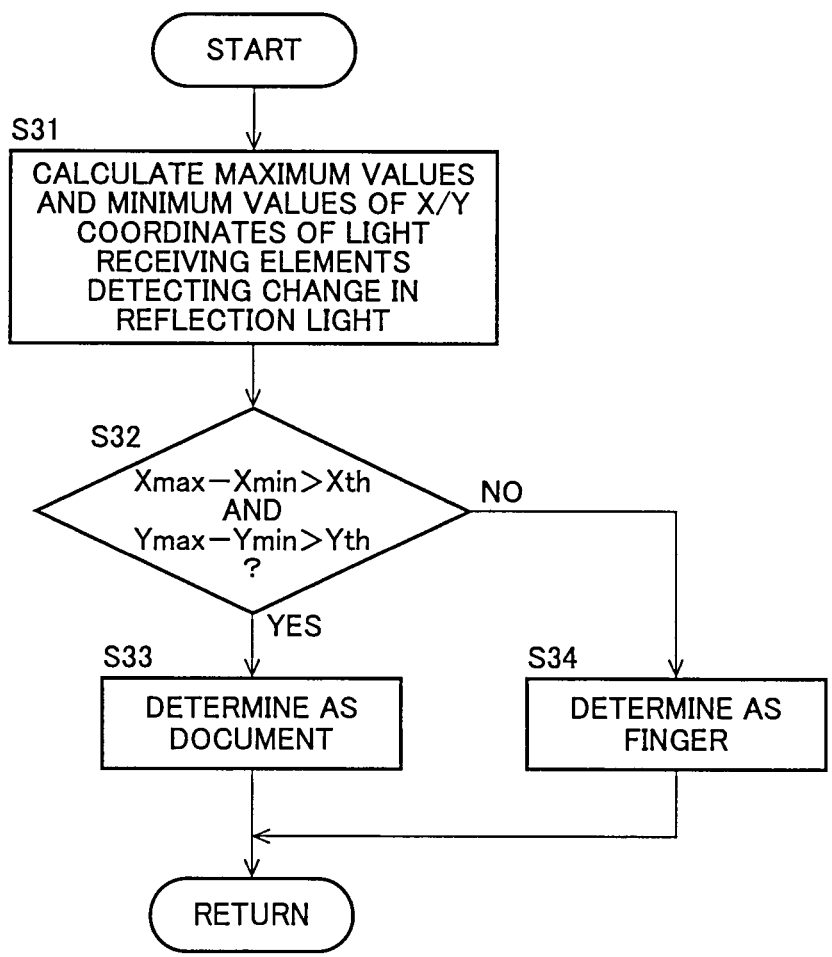
FIG. 10 is a flowchart illustrating an example of the processing at step S2 shown in FIG. 8.

FIG. 10 is a flowchart illustrating an example of the processing at step S3 shown in FIG. 8. In the present example, description will be given for processing of determining whether a document or a finger, when reflection light is detected by the area sensor portion 401b.

For all light receiving elements in which a change in reflection light is detected, the main CPU 101 calculates maximum values (X max, Y max) and minimum values (X min, Y min) of X coordinates and Y coordinates of the light receiving elements (step S31). When both of the difference between X coordinates (X max, X min) and the difference between Y coordinates (Y max, Y min) are larger than the threshold values Xth and Yth (in the case of YES at step S32), it is determined that a document is placed on the area sensor portion 401b (step S33), and otherwise (in the case of NO at step S32), it is determined that a finger of a user is placed (step S34). Note that, the threshold values Xth and Yth are set to substantially intermediate value between a minimum size considered as a document and a maximum size considered as an area of a finger tip, for example, to Xth and Yth=30 mm.

In addition, description will be give for another example of a screen displayed by the integral display portion 401.

Figure 11:
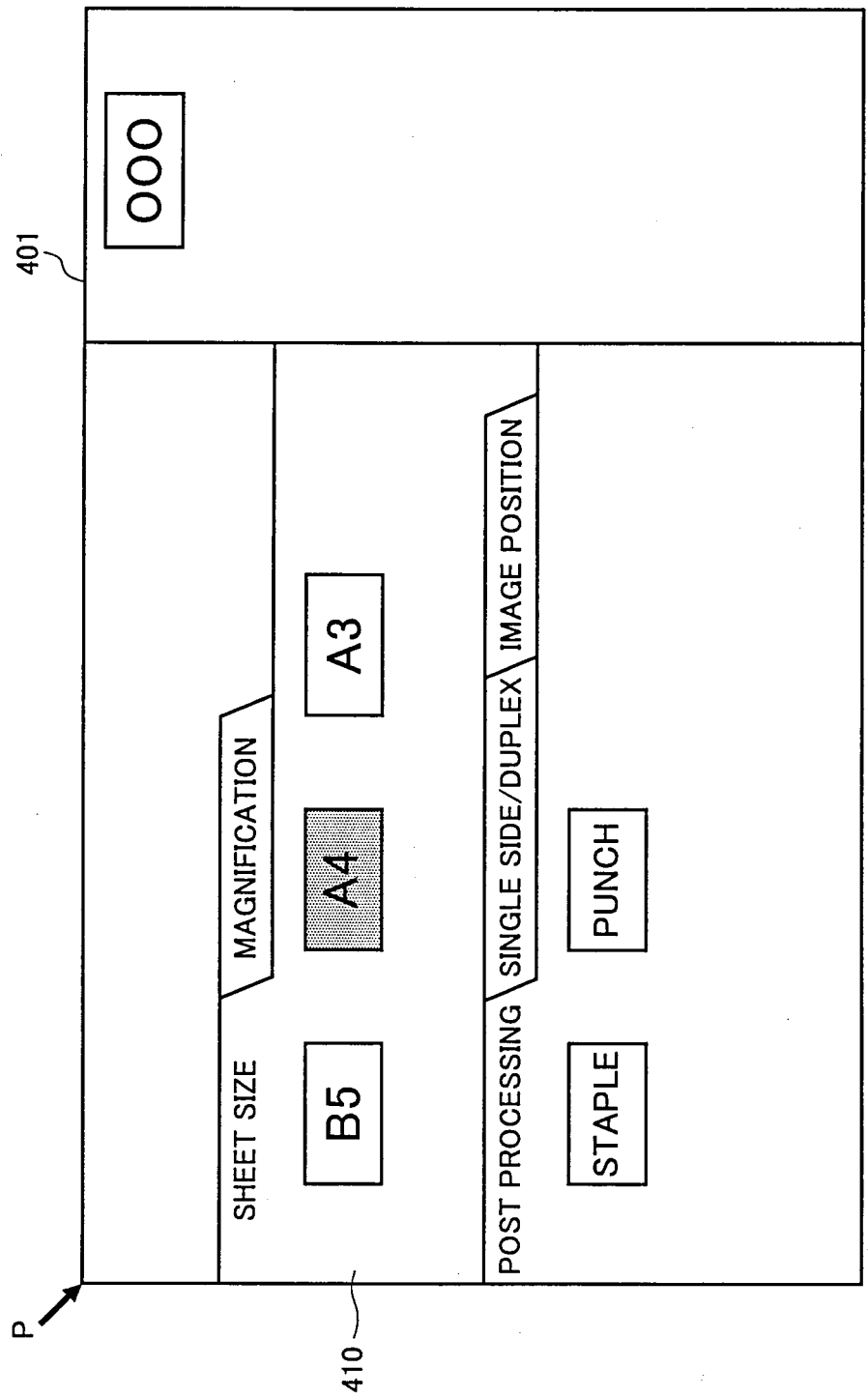
FIG. 11 is a view showing an example of an initial screen when a menu tab including various operation keys is displayed without previously providing a reading area.

FIG. 11 is a view showing an example of an initial screen when the menu tab 410 including various operation keys is displayed without previously providing a reading area.

In FIG. 11, the document reading apparatus displays, as an initial screen, only the menu tab 410 including various operation keys without providing the "small-sized document reading area" which is the reading area shown in FIG. 5 above. The menu tab 410 displays various operation keys of the document reading apparatus for each menu tab and, for example, tabs, including a sheet size, a magnification, post processing, single side/duplex and an image position, are displayed so as to be switchable. Note that, in the present example, since "A4" is selected as the sheet size, the document 45 is printed on a A4-sized sheet.

By making a display as described in this example, the display area of the menu tab 410 is not allocated to the "small-sized document reading area" which is the area of reading a document, thus making it possible to display more menus on the screen.

When it is detected by the area sensor portion 401b of the integral display portion that the document 45 is placed, the display is shifted to the screen display shown in FIG. 6A. In this way, when the document 45 is placed on the screen, the document reading apparatus detects an area where the document 45 is placed and displays an area other than the area where the document 45 is placed as an operation area of the document reading apparatus.

Figure 12B:
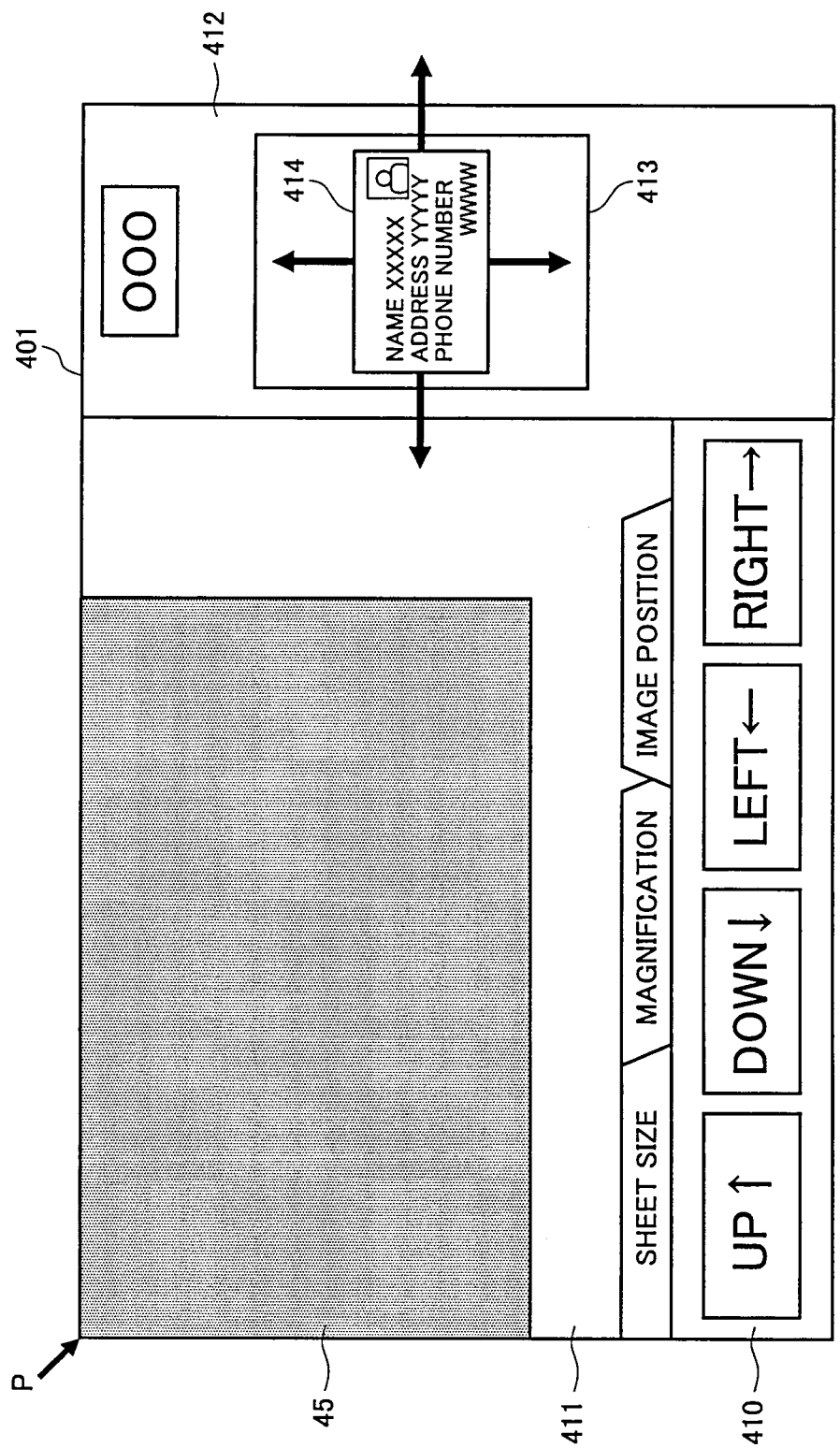

FIGS. 12A and 12B are views showing another example of a screen displayed by the integral display portion 401 provided with the area sensor. The present example will show the case where a user sets a copying magnification or an image position while viewing the display on the preview area 412.

FIG. 12A shows a state where a magnification tab in the menu tab 410 is pressed, and by pressing an UP button or a DOWN button, a size of the thumbnail image 414 on the preview area 412 is changed. That is, the integral display portion 401 displays the preview image 414 of the document 45 as image data (image) formed on recording paper (external form of sheet 413) of a size (herein, A4) specified by a user, and the main CPU 101 is capable of changing a magnification of the preview image 414 in the external form of the sheet 413 on the preview area 412, in accordance with a user operation.

In addition, FIG. 12B shows a state where an image position tab in the menu tab 410 is pressed, and by pressing an UP button, a DOWN button, a LEFT button, or a RIGHT button, a position for the external form of the sheet 413 in the thumbnail image 414 on the preview area 412 is changed. That is, the integral display portion 401 displays the preview image 414 of the document 45 as image data (image) formed on recording paper (external form of sheet 413) with a size (herein A4) specified by a user, and the main CPU 101 is capable of moving a position of the preview image 414 in the external form of the sheet 413 on the preview area 412, in accordance with a user operation.

Figure 13:
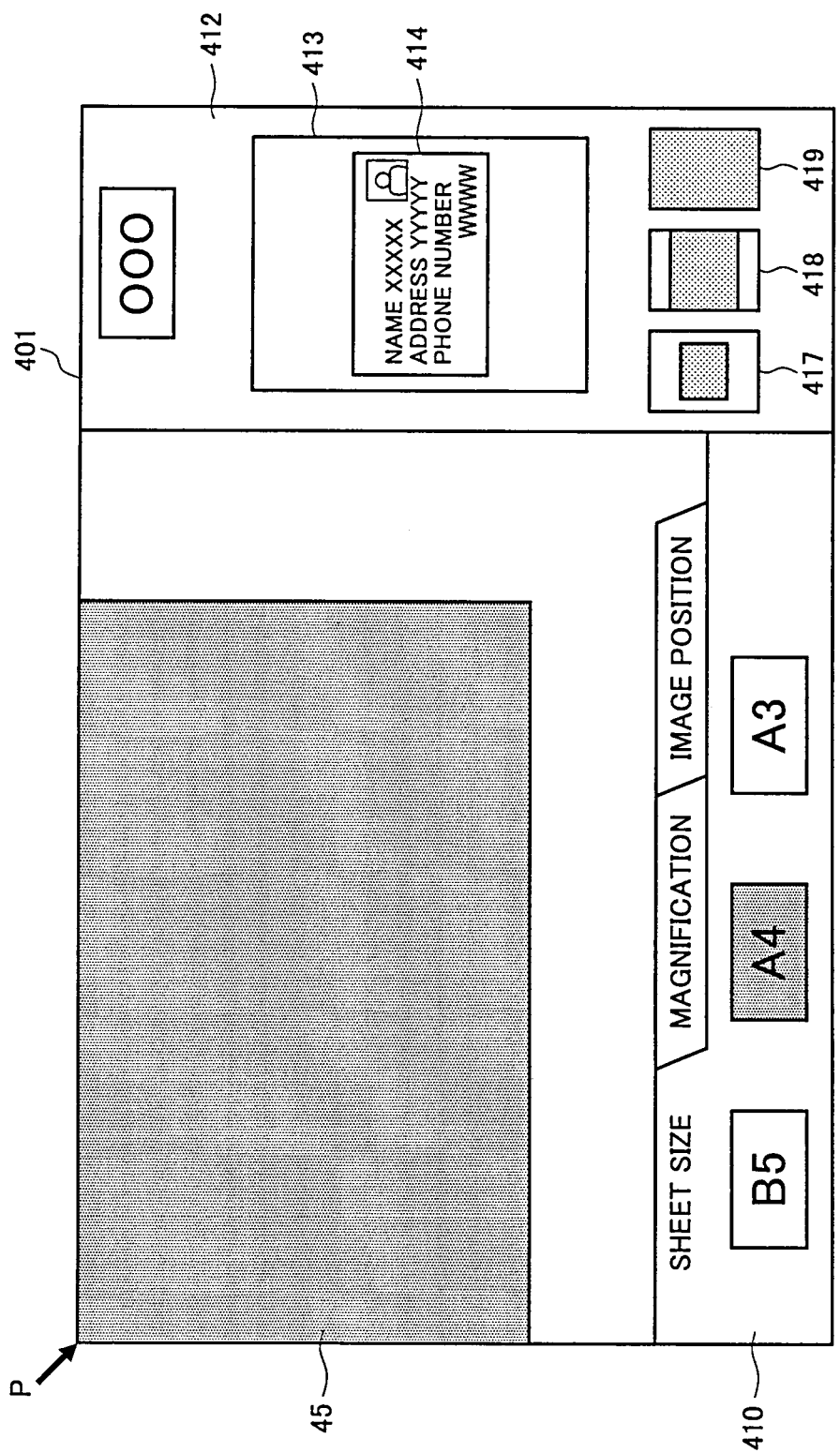
FIG. 13 is a view showing another example of a screen displayed by the integral display portion provided with the area sensor.

FIG. 13 is a view showing another example of a screen displayed by the integral display portion 401 provided with the area sensor. In the present example, icon menus showing a position of image formation and a magnification of image formation (a normal 417, a full width 418, and a full sheet size for image rotation 419) are displayed on the preview area 412. A user is able to easily select a magnification and a position by specifying any of the icon menus. That is, the integral display portion 401 displays the preview image 414 of the document 45 as image data (image) formed on recording paper (external form of sheet 413) with a size (herein A4) specified by a user, and displays the menus so that a candidate for the position of the preview image 414 in the external form of the sheet 413 can be selected by a user. In accordance with the selection in the menus by a user, the main CPU 101 is capable of moving a position and changing a magnification of the preview image 414 in the external form of the sheet 413 on the preview area 412.

Moreover, the integral display portion 401 may display the menus so that a candidate for the magnification of the preview image 414 in the external form of the sheet 413 can be selected by a user. In this case, the main CPU 101 is capable of changing a magnification of the preview image 414 in the external form of the sheet 413 on the preview area 412, in accordance with the selection in the menus by a user.

According to the present invention, the following effects can be obtained.

According to the present invention, since a document can be read on the display screen of the operation panel using the area sensor, it is not necessary to set the document on the document platen, and therefore, it is possible to prevent the document form being left behind.

Furthermore, when an object is placed on the display screen, whether or not the object is a document is determined, and it is possible to improve the operability since the document reading mode and the user operation mode can be automatically switched based on the determination result.

The invention claimed is:

1. A document reading apparatus, comprising:
a display portion integrally provided with an area sensor; and
a control portion for detecting, by the area sensor, reflection light from an object placed on a screen of the display portion; wherein
the control portion determines whether the object is a document or a finger of a user based on an area of reflection light from the object, and
when determined as a document, setting a document reading mode for reading the document placed on the screen by the area sensor, and
when determined as a finger of a user, receiving a user operation by the area sensor.

2. The document reading apparatus as defined in claim 1, wherein
the control portion sets, on the screen of the display portion, a reading area for reading a document and an operation area for displaying an operation key of the document reading apparatus.

3. The document reading apparatus as defined in claim 1, wherein
the display portion has, on the screen, an operation area for displaying an operation key of the document reading apparatus, and
when the control portion determines that the object is a document, setting an area other than an area having the document placed thereon as the operation area.

4. The document reading apparatus as defined in claim 2, wherein
the control portion displays, on the operation area of the document reading apparatus, an operation key for confirming whether to switch to a N-up mode for putting a plurality of documents in a single page together.

5. The document reading apparatus as defined in claim 2, wherein
the control portion displays a preview image of the document on the operation area of the document reading apparatus.

6. The document reading apparatus as defined in claim 5, wherein
the display portion displays the preview image of the document with an image showing an external form of recording paper with a size specified by a user, and
the control portion is capable of moving a position of the preview image in the image of the external form of the recording paper in accordance with a user operation.

7. The document reading apparatus as defined in claim 5, wherein
the display portion displays the preview image of the document with an image showing an external form of recording paper with a size specified by a user, and
the control portion is capable of changing a magnification of the preview image in the image of the external form of the recording paper in accordance with a user operation.

8. The document reading apparatus as defined in claim 5, wherein
the display portion displays the preview image of the document with an image showing an external form of recording paper with a size specified by a user, and displays a menu so that a candidate of the position of the preview image in the image is capable of being selected by a user, and
the control portion is capable of changing the position of the preview image with respect to the image of the external form of the recording paper by moving the preview image in accordance with selection by the user in the menu of the size of the recording paper.

9. The document reading apparatus as defined in claim 5, wherein
the display portion displays the preview image of the document with an image showing an external form of recording paper with a size specified by a user, and displays a menu so that a candidate of the magnification of the preview image in the image is capable of being selected by a user, and
the control portion is capable of changing the magnification of the preview image in the image of the external form of the recording paper in accordance with selection by the user in the menu.

10. The document reading apparatus as defined in claim 5, wherein
a rectangular area is set to read an image within the rectangular area,
the rectangular area has a set of diagonal points which is a set of light receiving elements each having a maximum coordinate and a minimum coordinate among the light receiving elements of the area sensor having detected reflection light from the document,
wherein the light receiving elements correspond to a plurality of micro optical sensors that comprise the area sensor.

11. The document reading apparatus as defined in claim 1, wherein
the display portion functions as a touch panel by the area sensor, and
the control portion detects a touch operation on an area where the document is not placed, in a state where the document is placed on the screen of the display portion.

12. The document reading apparatus as defined in claim 1, wherein the control portion specifies a document placement area and a non-placement area on the screen of the display portion to change a display of the document placement area thus specified to a display in a uniform single color.

13. An image forming apparatus comprising the document reading apparatus as defined in claim 1.

\* \* \* \* \*